Jan. 10, 1939. W. T. TOOLAN 2,143,289
FISHING REEL SEAT
Filed June 9, 1936
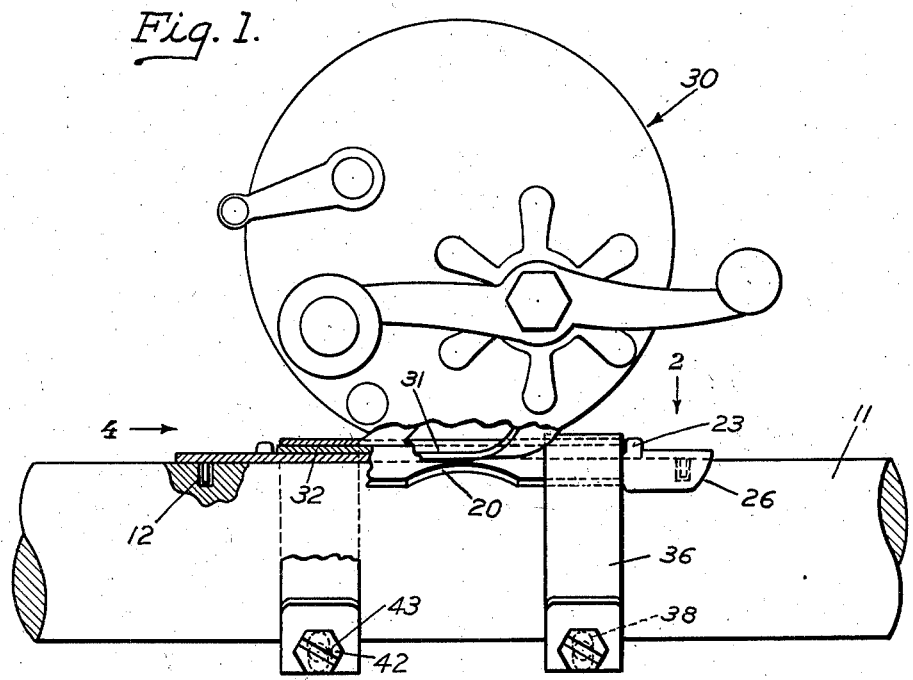
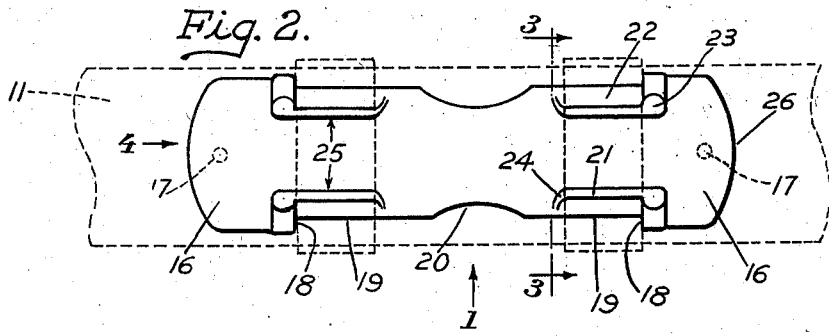
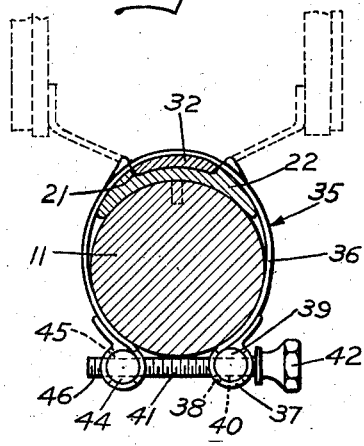
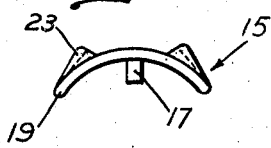
Inventor
William T. Toolan
by Hazard and Miller
Attorneys Patented Jan. 10, 1939

2,143,289

UNITED STATES PATENT OFFICE 2,143,289

FISHING REEL SEAT

William T. Toolan, Los Angeles, Calif.

Application June 9, 1936, Serial No. 84,275

3 Claims. (Cl. 43—22)

My invention relates to a combination of a seat plate or body with means to form an interfitting connection with a fishing rod, this seat having a structure on which the base of a reel is designed to have a seating connection together with bandlike clamps which attach the base of the reel, the straplike seat and the rod together.

It has been a common practice to use the various types of seats in the form of longitudinal straps or the like, on fishing rods with means interengaging and sometimes interlocking between the supporting base of a reel for the fishing line and the structure forming the seat. However it sometimes happens that the base of the reel becomes loosened from this straplike seat and the reel is lost. Therefore, an object and feature of my invention is a construction by which encircling bands not only attach the seat to the fishing pole but clamp the base of the reel to the straplike seat and hence the assembly to the rod. Another detail object and feature of my invention is using a rod which is circular in cross section and providing a plurality of sockets or dowel-holes extending inward radially and in these fit pins or dowels secured to the inner side of a transversely curved straplike seat formed of metal, such seat being provided with parallel longitudinal shoulders to engage and confine opposite end portions of the base of a reel. The encircling straps attached by bolts then encircle the end portions or flanges of the base of the reel and the strap forming the seat. End lugs extending above the longitudinal shoulders engage the encircling straps at each end and prevent these slipping out of place.

My invention is illustrated in connection with the accompanying drawing, in which:

Figure 1 is a side elevation taken in the direction of the arrow 1 of Figure 2 showing part of the rod broken away and giving a partial longitudinal section of the seat, a section through the strap and the flange portion of the base of the reel.

Figure 2 is a plan of the seat taken in the direction of the arrow 2 of Figure 1, the reel and its base being removed.

Figure 3 is a transverse section on the line 3—3 of Figure 2 taken in the direction of the arrows, the straps however, being shown in end elevation.

Figure 4 is an end elevation of the seat taken in the direction of the arrow 4 of Figure 1 or 2, this figure omitting the strap.

In my invention a portion of a fishing rod is indicated by the numeral 11. This is circular in cross section and has two sockets or dowel-holes 12 extending inwardly radially and preferably in the same longitudinal line. The seat member 15 is formed of a metal plate, the main portion of which is concave on one side and convex on the other to fit the shape of the rod. This plate has two enlarged end portions 16 with the pins or dowels 17 extending inwardly from the concave side. The plate is the same at opposite ends. The end portions proper terminate at inwardly turned abutment shoulders 18 and extending towards the center the side edges 19 are parallel and at the center the side edges have a convex curve 20. Extending towards the center from the ends 16 there are two parallel shoulders 21 formed by a thickened section 22 inwardly of the shoulders. A pair of lugs 23 are constructed on the ends of the thickened portion 22, that is, at the ends of the shoulders 21. The opposite ends of these shoulders taper outwardly as indicated at 24, the thickened portion merging with the edge 19. The portion between the shoulders 21, indicated by the measurement line 25 form the main portion of the seat for accommodating the base of the reel as hereinunder described and this surface is cylindrical on its outside, being convex and this smooth convex surface extends from one convex end edge 26 to the opposite convex end edge. The metal seat is not secured to the fishing pole, the pins 17 merely fitting in the sockets or dowel-holes 12.

The reel designated by the assembly numeral 30, is of standard construction and has a base 31 with flanges 32 extending in opposite directions. These flanges fit in the space 25 between the shoulders 21 and the lugs 23. Of course they can extend beyond the lugs if desired.

The clamps designated by the assembly numeral 35, each have a strap 36 with eyes 37 formed at opposite ends of the strap. The eyes have diametrically opposite slots 38. In one of the eyes is a cylindrical hub 39 with a perforation 40 therethrough to accommodate the bolt 41. Such bolt has a nut wrench head 42 shown hexagonal. The heads are preferably also supplied with screwdriver kerfs 43.

The opposite eye has a cylindrical nut hub 44 with a diametrical threaded perforation 45. The bolt has a threaded end 46 which is smaller than the perforation 40 so that the threaded part of the bolt may pass freely through the hub 39 but this is threaded into the threads 45 of the hub 44. Each strap fits over the longitudinally extending flange 32 of the base of the reel. It fits over the thickened section 22 adjacent the parallel shoulders 21 and is confined from slipping off the end of the strap by the lugs 23, which as above mentioned, are slightly higher than the parallel shoulders 21. Therefore when the bolts 41 are tightened and threaded into the hubs 44, the metal straps are clamped tightly around the fishing pole 11 and confine the extending flanges 32 of the base of the reel to the seat and the straps also attach the seat to the pole, therefore firmly securing the assembly to the fishing pole. When making the attachment it is necessary to unscrew the bolt of one of the clamps so that the clamping strap may be slipped outwardly over the top of the lug 23 and then replaced to be in the proper position for clamping the flange ends 32 of the base 31 of the reel. It will be obvious that the reel may be removed by loosening the bolts 41 until one of the clamping straps may be removed from the assembly. The other flange 32 of the base of the reel may then be withdrawn from under the other strap to disassemble the fishing reel and the seat for the same from the rod. It will thus be seen that the same assembly for attaching the reel may be used with other rods. Also, in order to prevent losing the seat after removal of the reel, the clamps may be used to attach the straplike seat to the rod, the straps being confined by the lugs 23.

Various changes may be made in the details of the construction without departing from the spirit or scope of the invention as defined by the appended claims.

I claim:

1. In a device as described, the combination of a seat in the form of an elongated plate concave less than a half circle on its lower side and convex on its upper side, two pairs of parallel shoulders on the convex side extending longitudinally, each pair being spaced apart; a lug at the end of each shoulder, the space between the shoulders being adapted to receive the flanges of a base of a reel and a pair of straps adapted to fit over the said parallel shoulders, portions of the straps positioned outside of the said shoulders abutting said lugs, each strap being adapted to encircle a fishing rod and attach the assembly of the reel and the seat to the rod.

2. In a device as described, the combination of a seat in the form of an elongated plate, concave less than a half circle on its lower side and convex on its upper side, two pairs of spaced parallel shoulders on the convex side extending longitudinally, the portion outside of the shoulders tapering to the edge of the plate, a lug at the end of each shoulder extending above the adjacent shoulder, each lug tapering to the adjacent edge of the plate, a base for a reel with a pair of flanges, each located between a pair of the parallel shoulders, each flange having a convex curve on its upper surface, and a pair of clamps, each having a strap fitting over a flange of the base and engaging a pair of the spaced shoulders and conforming to the taper of said shoulders, the strap being restrained from outward movement by the lugs at the end of a pair of shoulders and a clamping means adjacent the ends of each strap adapted to clamp the seat and the base of a reel to a fishing rod.

3. In a device as described, a seat for the base of a reel in the form of an elongated plate, concave for a distance less than half a circle on its inner side and convex on its outer side, the concave and convex sides being substantially concentric as to the main portion of the plate, said plate having relatively wide ends with abutment shoulders extending inwardly from opposite edges and portions of the plate therebetween having substantially parallel side edges, the end portions having a pair of lugs extending above the convex surface and tapering to the side edges of the enlarged ends, a pair of spaced parallel shoulders extending from each pair of lugs towards the center portion of the plate considered between its opposite ends thus positioning the parallel shoulders slightly spaced from the parallel side edges of the central portion of the plate, the parallel shoulders being formed by thickened parts of the plate having a convex curve to the edge of the plate of lesser radius than the convex outer side of the plate which is concentric to the concave inner side, the parallel shoulders on each side being in alignment adapted to form a seat space between each pair of shoulders in alignment adapted to receive the base of a reel in said seat space between the parallel shoulders, the lugs and the end abutment shoulders being adapted to position a clamping strap adapted to encircle the base of a reel and the two pairs of parallel shoulders, whereby the plate and the base of a reel may be clamped to a fishing rod by the same clamps.

WILLIAM T. TOOLAN.